United States Patent
Chen

(10) Patent No.: US 11,817,590 B2
(45) Date of Patent: Nov. 14, 2023

(54) GAS DIFFUSION LAYER OF PROTON EXCHANGE MEMBRANE FUEL CELL AND PREPARATION METHOD OF GAS DIFFUSION LAYER

(71) Applicant: Robert Bosch GmbH, Stuttgart (DE)

(72) Inventor: Bicheng Chen, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 17/637,592

(22) PCT Filed: Sep. 6, 2019

(86) PCT No.: PCT/CN2019/104632
§ 371 (c)(1),
(2) Date: Feb. 23, 2022

(87) PCT Pub. No.: WO2021/042352
PCT Pub. Date: Mar. 11, 2021

(65) Prior Publication Data
US 2022/0278337 A1    Sep. 1, 2022

(51) Int. Cl.
*H01M 4/88* (2006.01)
*H01M 8/1004* (2016.01)

(52) U.S. Cl.
CPC ....... *H01M 4/8807* (2013.01); *H01M 4/8882* (2013.01); *H01M 8/1004* (2013.01)

(58) Field of Classification Search
None
See application file for complete search history.

(56) References Cited

U.S. PATENT DOCUMENTS

| 2009/0269667 A1* | 10/2009 | Antonietti | H01M 4/583 |
| | | | 428/315.9 |
| 2014/0287908 A1* | 9/2014 | Lee | C01B 32/23 |
| | | | 252/182.1 |
| 2018/0145341 A1 | 5/2018 | Sung et al. | |

FOREIGN PATENT DOCUMENTS

| CN | 101559944 A | 10/2009 |
| CN | 103943877 A | 7/2014 |
| CN | 107230814 A | 10/2017 |
| CN | 107342431 A | 11/2017 |
| CN | 108878922 A | 11/2018 |
| JP | 2003-238131 A | 8/2003 |
| JP | 2014-518835 A | 8/2014 |
| JP | 2018133271 A * | 8/2018 |

OTHER PUBLICATIONS

JP-2018133271-A—machine translation (Year: 2018).*
International Search Report corresponding to PCT Application No. PCT/CN2019/104632, dated May 27, 2020 (Chinese and English language document) (5 pages).

* cited by examiner

*Primary Examiner* — Haroon S. Sheikh
(74) *Attorney, Agent, or Firm* — Maginot, Moore & Beck LLP

(57) ABSTRACT

The present disclosure provides a gas diffusion layer for a proton exchange membrane fuel cell. The gas diffusion layer is a graphene membrane, and graphene lamellae in the graphene membrane are arranged irregularly. The present disclosure further provides a preparation method for the gas diffusion layer, and the proton exchange membrane fuel cell including the gas diffusion layer.

7 Claims, 2 Drawing Sheets

GAS DIFFUSION LAYER OF PROTON EXCHANGE MEMBRANE FUEL CELL AND PREPARATION METHOD OF GAS DIFFUSION LAYER

This application is a 35 U.S.C. § 371 National Stage Application of PCT/CN2019/104632, filed on Sep. 6, 2019, the disclosures of which are incorporated herein by reference in their entirety.

The present disclosure relates to a gas diffusion layer for a proton exchange membrane fuel cell, wherein the gas diffusion layer is a graphene membrane, and graphene lamellae in the graphene membrane are arranged irregularly. The present disclosure also relates to a method for preparing the gas diffusion layer, and a proton exchange membrane fuel cell comprising the gas diffusion layer.

BACKGROUND

Due to the use of a thin solid polymer membrane as an electrolyte, proton exchange membrane fuel cells have many advantages, such as being able to start up quickly at low temperatures, having no loss of liquid electrolyte, being non-corrosive, having a long life, a high specific energy, a high specific power and a simple design, and being convenient to manufacture. For this reason, proton exchange membrane fuel cells have attracted widespread attention in recent years.

As shown in FIG. 1, a proton exchange membrane fuel cell generally comprises an anode plate (60), an anode gas diffusion layer (40), an anode catalyst layer (20), a proton exchange membrane (10), a cathode catalyst layer (30), a cathode gas diffusion layer (50) and a cathode plate (70) arranged in sequence.

At the cathode and the anode, both gas diffusion layers serve the function of supporting the catalyst layers, as well as providing electron channels, gas channels and water discharge channels for the electrochemical reaction. A conventional method of preparing the gas diffusion layer is as follows: First of all, hydrophobicity treatment is carried out. Porous carbon paper (or carbon cloth) is immersed multiple times in polytetrafluoroethylene (PTFE), then the carbon paper impregnated with PTFE is heated, so that the PTFE is sintered. Next, carbon black and a PTFE emulsion are blended to form a slurry, which is then spread onto the hydrophobicity-treated carbon paper by silkscreen printing or spraying, etc., thereby obtaining the gas diffusion layer. In the gas diffusion layer thus prepared, large pores in the carbon paper are covered by PTFE, being used as hydrophobic pores, and serving as diffusion channels for reaction gases. Small pores in the carbon paper are not covered by PTFE, being used as hydrophilic pores, and serving as discharge channels for the product water. However, the PTFE coating itself is not electrically conductive, and the introduction of the hydrophobic material PTFE will lower the carbon paper's electrical conductivity. In addition, as the proton exchange membrane fuel cell is undergoing charging/discharging cycles, the PTFE coating easily falls off in high-temperature (about 80° C.), high-humidity environments, lowering the hydrophobicity of the gas diffusion layer, and in turn leading to deterioration in cell performance (e.g. electrochemical performance and discharge stability).

Thus, there is a need to improve the gas diffusion layer of the proton exchange membrane fuel cell, and in turn improve the cell performance (e.g. electrochemical performance and discharge stability) of the proton exchange membrane cell).

SUMMARY

To this end, the present disclosure provides a gas diffusion layer for a proton exchange membrane fuel cell, wherein the gas diffusion layer is a graphene membrane, and graphene lamellae in the graphene membrane are arranged irregularly. It is thereby possible to achieve high hydrophobicity, high electrical conductivity and high thermal conductivity at a low cost, and thus possible to improve the electrochemical performance and discharge stability of the proton exchange membrane fuel cell.

The present disclosure further provides a method for preparing a gas diffusion layer for a proton exchange membrane fuel cell, comprising the following steps:

a) heating a graphene oxide solution while stirring and/or under ultrasonication to remove a solvent, thus obtaining a graphene oxide membrane, wherein graphene oxide lamellae in the graphene oxide membrane are arranged irregularly; and b) heating and reducing the graphene oxide membrane at a temperature not lower than 900° C., to obtain a graphene membrane, wherein graphene lamellae in the graphene membrane are arranged irregularly. The method of the present disclosure for preparing a graphene membrane has simple operations and good controllability, as well as being low-cost.

The present disclosure further provides a proton exchange membrane fuel cell, comprising the gas diffusion layer as described above or the gas diffusion layer prepared by the method as described above as a cathode gas diffusion layer and/or an anode gas diffusion layer.

The proton exchange membrane fuel cell according to the present disclosure may be used in energy storage systems (e.g. dispersed fuel cell power plants), electric vehicles and portable devices.

Various other features, aspects and advantages of the present disclosure will become more obvious through reference to the drawings below. These drawings are not drawn to scale, being intended to explain schematically various structures and positional relationships, and should not be understood to be restrictive.

DETAILED DESCRIPTION

Unless otherwise defined, all technical and scientific terms used herein have the meanings commonly understood by those skilled in the art. In case of inconsistency, the definition provided in the present application should be considered accurate.

Unless otherwise indicated, the ranges of values set out herein are intended to include the endpoints of the ranges, as well as all values and all sub-ranges within the ranges.

All of the materials, contents, methods, equipment, drawings and examples herein are exemplary, and unless otherwise stated, should not be understood as being restrictive.

As used herein, "includes", "comprises" and "has" all indicate that other components or other steps that do not influence the final result may be included. These terms cover the meanings of "consists of . . . " and "substantially consists of . . . ". The product and method according to the present disclosure may include or comprise necessary technical features described in the present disclosure, as well as additional and/or optionally present components, constituents, steps or other limiting features described herein; or may consist of necessary technical features described in the present disclosure, as well as additional and/or optionally present components, constituents, steps or other limiting features described herein; or substantially consist of necessary technical features described in the present disclosure, as well as additional and/or optionally present components, constituents, steps or other limiting features described herein.

Unless clearly stated otherwise, all materials and reagents used in the present disclosure are commercially available.

Unless otherwise indicated or there is an obvious contradiction, all operations performed herein may be performed at room temperature and atmospheric pressure.

Unless otherwise indicated or there is an obvious contradiction, the method steps in the present disclosure may be performed in any suitable order.

Examples of the present disclosure are described in detail below.

Gas Diffusion Layer

As stated above, at the cathode and the anode, both gas diffusion layers serve the function of supporting the catalyst layers, as well as providing electron channels, gas channels and water discharge channels for the electrochemical reaction. According to the present disclosure, the gas diffusion layer of the proton exchange membrane fuel cell is a graphene membrane in which graphene lamellae are irregularly arranged.

Figure 2:
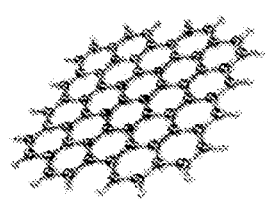
FIG. 2 shows a schematic structural drawing of graphene.

FIG. 2 shows a structural schematic drawing of graphene. A carbon atom has 6 electrons, of which 4 are valence electrons. In graphene, 3 valence electrons of each carbon atom are connected with σ bonds by $sp^2$ hybridization to form a hexagonal honeycomb layer structure, the 1 remaining unbonded valence electron being located on a pz orbital perpendicular to the honeycomb plane, and forming a large n bond; the n electrons can move freely, and thus endow the graphene with excellent electrical conductivity.

According to the present disclosure, there are no specific restrictions on the shape, thickness or area of the graphene lamella, as long as the object of the present disclosure can be achieved. In some examples, the graphene lamella may be a single layer of graphene or multiple layers of graphene. For example, the graphene lamella may comprise 1 to about 100 layers of graphene, and preferably comprises 5 to about 15 layers of graphene, for example about 5 layers, about 6 layers, about 7 layers, about 8 layers, about 9 layers, about 10 layers, about 11 layers, about 12 layers, about 13 layers, about 14 layers or about 15 layers. The ideal thickness of a single layer of graphene is about 0.35 nm. When the graphene lamella comprises multiple layers of graphene, the graphene lamella is a stack of multiple layers of graphene, and the thickness of the graphene lamella is the sum of the thicknesses of all of the layers of graphene and the interlayer gaps. In some examples, the thickness of the graphene lamella is about 0.35-about 50 nm, preferably about 0.35-about 5 nm.

Figure 3:
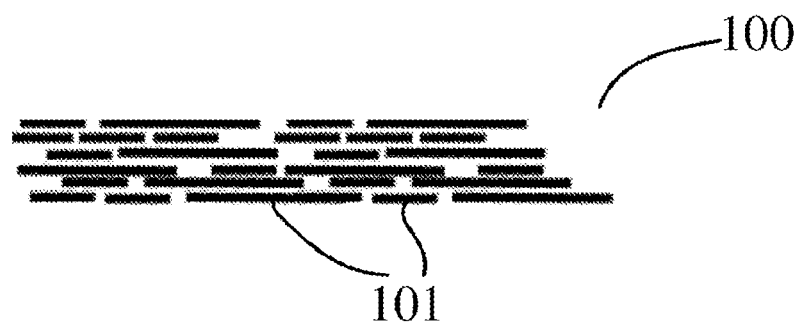
FIG. 3 shows a schematic sectional drawing, in the direction of membrane thickness, of a graphene oxide membrane and a graphene membrane prepared by a conventional method.
Figure 4:
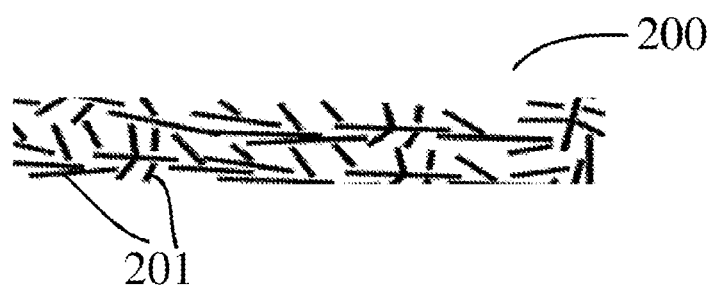
FIG. 4 shows a schematic sectional drawing, in the direction of membrane thickness, of a graphene oxide membrane and a graphene membrane according to the present disclosure.

The shape of the graphene lamella may be regular or irregular, e.g. rectangular or polygonal. As shown in FIGS. 3 and 4, in the graphene membrane (100 or 200), the shape of the graphene lamella (101 or 201) is rectangular; the multiple black rectangles in the figures all represent graphene lamellae. The equivalent diameter or transverse distance of the graphene lamella is about 0.1-about 80 μm, preferably about 0.5-about 50 μm, and more preferably about 1-about 2 μm. Here, equivalent diameter or transverse distance means the length of the graphene lamella. If the graphene lamella is rectangular or approximately rectangular, the equivalent diameter or transverse distance corresponds to the long side of the rectangle. If the graphene lamella is polygonal, then the polygon is considered to correspond to a circle, and the equivalent diameter or transverse distance corresponds to the diameter of the circle.

As shown in FIG. 4, in the graphene membrane (200) of the present disclosure, the graphene lamellae (201) are distributed in a disorderly fashion, and gaps between the graphene lamellae (201) allow water molecules to pass through, thus endowing the graphene membrane of the present disclosure with hydrophobicity. Thus, the gas diffusion layer of the present disclosure does not need to undergo additional hydrophobicity treatment, and thus can achieve high hydrophobicity at a low cost, as well as avoiding deterioration in the electrochemical performance and discharge stability of the proton exchange membrane fuel cell due to the use of PTFE.

A conventional method of preparing a graphene membrane may consist of suction filtration of a graphene oxide solution, followed by reduction. FIG. 3 shows a schematic sectional drawing, in the direction of membrane thickness, of a graphene oxide membrane and a graphene membrane prepared by a conventional method. In the graphene oxide membrane and graphene membrane prepared by the conventional method, the graphene lamellae are arranged or distributed in similar ways; for this reason, FIG. 3 can represent a schematic sectional drawing, in the direction of membrane thickness, of a graphene membrane (100), and can also represent a schematic sectional drawing, in the direction of membrane thickness, of a graphene oxide membrane (100). Specifically, if the reference label 100 represents a graphene oxide membrane, then the reference label 101 represents a graphene oxide lamella. If the reference label 100 represents a graphene membrane, then the reference label 101 represents a graphene lamella. In the graphene oxide membrane (100) obtained as an intermediate product by suction filtration, the graphene oxide lamellae (101) exhibit a highly oriented liquid crystal phase, being arranged in parallel in the plane and stacked in layers. In the graphene membrane (100) obtained by reduction, the graphene lamellae (101) also exhibit a highly oriented liquid crystal phase, being arranged in parallel in the plane and stacked in layers. As used herein, the expression "in the plane" means in the plane of the graphene oxide membrane or graphene membrane. Those skilled in the art know that from the perspective of achieving high thermal conductivity in the graphene membrane (100), the more orderly the arrangement of graphene lamellae (101) in the plane, the better. Such a graphene membrane (100) exhibits anisotropic properties, e.g. the thermal conductivity and/or electrical conductivity in the in-plane direction differ(s) considerably from the thermal conductivity and/or electrical conductivity perpendicular to the in-plane direction (i.e. in the thickness direction of the graphene membrane); for example, the former is several tens of times greater than the latter, e.g. about 50 or more times greater, e.g. about 70-about 80 times greater, or about 100 or more times greater. However, the graphene membrane (100) formed of the graphene lamellae (101) stacked in layers and arranged in an orderly fashion in the plane is compact, with gas and water being unable to pass through, and this prevents the graphene membrane (100) prepared by the conventional method from being used as a gas diffusion layer.

FIG. 4 shows a schematic sectional drawing, in the direction of membrane thickness, of a graphene oxide membrane and a graphene membrane according to the present disclosure. In the graphene oxide membrane and graphene membrane according to the present disclosure, the graphene lamellae are arranged or distributed in similar ways; for this reason, FIG. 4 can represent a schematic sectional drawing, in the direction of membrane thickness, of a graphene membrane (200), and can also represent a schematic sectional drawing, in the direction of membrane thickness, of a graphene oxide membrane (200). Specifically, if the reference label 200 represents a graphene oxide membrane, then the reference label 201 represents a graphene oxide lamella. If the reference label 200 represents a graphene membrane, then the reference label 201 represents a graphene lamella. In contrast to the graphene membrane (100) prepared by the conventional method, the graphene lamellae (201) are arranged irregularly in the graphene membrane (200) prepared according to the present disclosure. In this text, irregular arrangement may also be referred to as disorderly distribution, meaning that within the graphene membrane (200), the graphene lamellae (201) do not form a stacked layer structure, and are not arranged in an oriented fashion in the plane. In other words, compared with the anisotropic graphene membrane (100) described above, the graphene membrane (200) of the present disclosure has reduced performance in the plane and enhanced performance in the thickness direction, thus reducing the difference between the performance in the plane and the performance in the thickness direction. In some examples, the graphene membrane (200) has isotropic thermal conductivity and isotropic electrical conductivity. Ideally, the in-plane electrical conductivity and thermal conductivity of the graphene membrane (200) are equal to or close to the electrical conductivity and thermal conductivity in the thickness direction. In some examples, the in-plane electrical conductivity and thermal conductivity of the graphene membrane (200) of the present disclosure are about 1 to about 20 times, preferably about 1 to about 15 times, more preferably about 1 to about 10 times, e.g. about 1 to about 5 times, or about 1 to about 2 times, greater than the electrical conductivity and thermal conductivity in the thickness direction. Compared with either the anisotropic graphene membrane (100) or a conventional gas diffusion layer (e.g. carbon paper or carbon cloth that has undergone hydrophobicity treatment), the ratio of in-plane electrical conductivity (or thermal conductivity) to electrical conductivity (or thermal conductivity) in the thickness direction is reduced by at least 10 times in the graphene membrane (200) of the present disclosure, e.g. reduced by about 20 to about 50 times, thus considerably improving the electrical conductivity of the gas diffusion layer.

Thus, the gas diffusion layer of the present disclosure can achieve high hydrophobicity, high electrical conductivity and high thermal conductivity at a low cost, and can thus improve the electrochemical performance and discharge stability of the proton exchange membrane fuel cell.

Method for Preparing Gas Diffusion Layer

The method of the present disclosure for preparing a gas diffusion layer comprises the following steps: a) heating a graphene oxide solution while stirring and/or under ultrasonication to remove a solvent, thus obtaining a graphene oxide membrane as an intermediate, wherein graphene oxide lamellae in the graphene oxide membrane are arranged irregularly; and b) heating and reducing the graphene oxide membrane at a temperature not lower than 900° C., to obtain a graphene membrane, wherein graphene lamellae in the graphene membrane are arranged irregularly.

The stirring and/or ultrasonication prevent the graphene oxide lamellae from exhibiting a highly oriented liquid crystal phase, such that the graphene lamellae obtained by reduction are also arranged irregularly, thus reducing the difference between the in-plane performance and the performance in the thickness direction, and in particular considerably enhancing the thermal conductivity and electrical conductivity in the thickness direction. In addition, the method of the present disclosure for preparing a graphene membrane has simple operations and good controllability, as well as being low cost.

In step a), either stirring or ultrasonication may be used, or both stirring and ultrasonication may be performed. If both stirring and ultrasonication are performed, the stirring and ultrasonication may be performed in any order, simultaneously or one after the other. Depending on actual needs, the stirring or ultrasonication may be performed once or multiple times.

In step a), there are no specific restrictions on the solvent in the graphene oxide solution, as long as the object of the present disclosure can be achieved. For example, the solvent may be water, a non-aqueous solvent, or a mixture of water and a non-aqueous solvent. The non-aqueous solvent may be an alcohol, for example a C1-C4 alcohol, e.g. methanol, ethanol, n-propanol, isopropanol, n-butanol, isobutanol or tert-butanol. In some examples, the graphene oxide solution is an aqueous solution of graphene oxide. If water is used as the solvent, the raw material is readily available and environmentally friendly.

In step b), heating and oxidation are performed in a vacuum or a reducing gas atmosphere, wherein the reducing gas is preferably hydrogen or carbon monoxide.

In step b), the heating temperature is not lower than 900° C., in order to cause the graphene oxide to undergo a reduction reaction. There are no specific restrictions on the upper limit of the heating temperature, and those skilled in the art may seek a balance, e.g. between reduction reaction speed, conversion ratio and cost, according to actual needs; for example, the heating temperature may be about 900° C., 1000° C., 1200° C., 1500° C., 2000° C. or 3000° C., etc.

Protein Exchange Membrane Fuel Cell

According to the present disclosure, the protein exchange membrane fuel cell may be a single protein exchange membrane fuel cell unit, or a protein exchange membrane fuel cell stack obtained by connecting two or more protein exchange membrane fuel cell units in parallel and/or in series.

The protein exchange membrane fuel cell may comprise the gas diffusion layer according to the present disclosure or the gas diffusion layer prepared by the method of the present disclosure, as a cathode gas diffusion layer and/or an anode gas diffusion layer.

Preferably, both the cathode gas diffusion layer and the anode gas diffusion layer of the proton exchange membrane fuel cell are gas diffusion layers according to the present disclosure or gas diffusion layers prepared by the method of the present disclosure.

Figure 1:
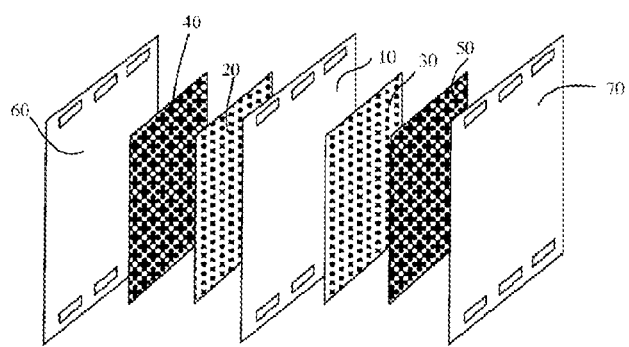
FIG. 1 is an exploded drawing of components of a proton exchange membrane fuel cell unit according to the prior art.

Referring to FIG. 1, the proton exchange membrane fuel cell unit according to the present disclosure may comprise an anode plate (60), an anode gas diffusion layer (40), an anode catalyst layer (20), a proton exchange membrane (10), a cathode catalyst layer (30), a cathode gas diffusion layer (50) and a cathode plate (70) arranged in sequence, wherein at least one, preferably both, of the anode gas diffusion layer (40) and the cathode gas diffusion layer (50) is/are (a) gas diffusion layer(s) according to the present disclosure or gas diffusion layer(s) prepared by the method of the present disclosure.

The anode fuel is hydrogen. The cathode fuel is oxygen or an oxygen-containing gas, such as air.

The proton exchange membrane provides a channel for proton transfer, and at the same time acts as a diaphragm to block electrons and cathode/anode reaction gases. In some examples, the proton exchange membrane is a perfluorosulfonic acid membrane. Commercially available examples of proton exchange membranes are Nafion membranes produced by the US company Dupont, for example Nafion 115, Nafion 112, Nafion 117 or Nafion 1035, etc.

The anode catalyst is used to catalyse the oxidation of hydrogen. The cathode catalyst is used to catalyse the reduction of oxygen. The cathode catalyst and anode catalyst are the same or different, and may be selected from precious metal catalysts, e.g. platinum or platinum alloys.

The two electrode plates comprise the cathode plate and the anode plate. The two electrode plates are used to collect and conduct current, block and convey fuels (e.g. hydrogen and oxygen), and conduct heat, etc. For example, the two electrode plates may be made of graphite or metal (e.g. titanium, stainless steel and nickel alloys, etc.).

The invention claimed is:

1. A method of preparing a gas diffusion layer for a proton exchange membrane fuel cell, comprising:

heating a graphene oxide solution while stirring and/or under ultrasonication to remove a solvent, thus obtaining a graphene oxide membrane including graphene oxide lamellae, wherein the graphene oxide lamellae in the graphene oxide membrane are not arranged in an oriented fashion in a plane of the graphene oxide membrane; and heating and reducing the graphene oxide membrane at a temperature not lower than 900° C., to obtain a graphene membrane including graphene lamellae, wherein the graphene lamellae in the graphene membrane are not arranged in an oriented fashion in a plane of the graphene oxide membrane.

2. The method as claimed in claim 1, wherein a thickness of the graphene lamellae is about 0.35-about 50 nm.

3. The method as claimed in claim 1, wherein the graphene oxide solution is an aqueous solution of graphene oxide.

4. The method as claimed in claim 1, wherein the heating and reduction of the graphene oxide membrane are performed in a vacuum or a reducing gas atmosphere.

5. The method as claimed in claim 4 wherein the heating and reduction of the graphene oxide membrane are performed in a reducing gas atmosphere of hydrogen or carbon monoxide.

6. The method as claimed in claim 1, wherein a thickness of the graphene lamellae is about 0.35-about 5 nm.

7. The method of claim 1, wherein an electrical conductivity and thermal conductivity of the graphene oxide membrane in the plane is 1 to 20 times an electrical conductivity and thermal conductivity of the graphene oxide membrane in a thickness direction.

* * * * *